Dec. 15, 1953    C. A. GIAUQUE    2,662,721
VALVE
Filed May 8, 1948    2 Sheets-Sheet 1
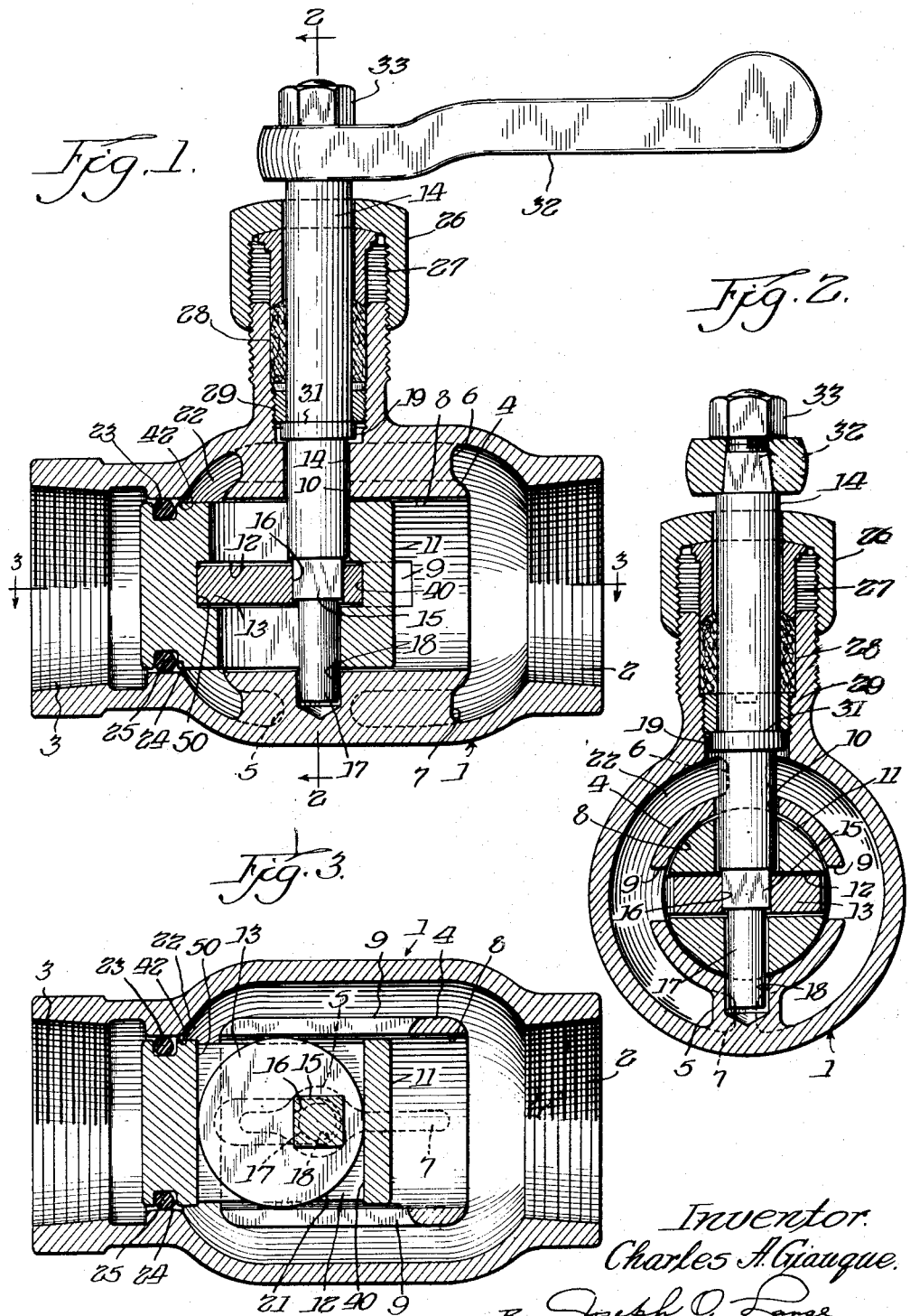
Inventor.
Charles A. Giauque.
By Joseph O. Lange
Atty.

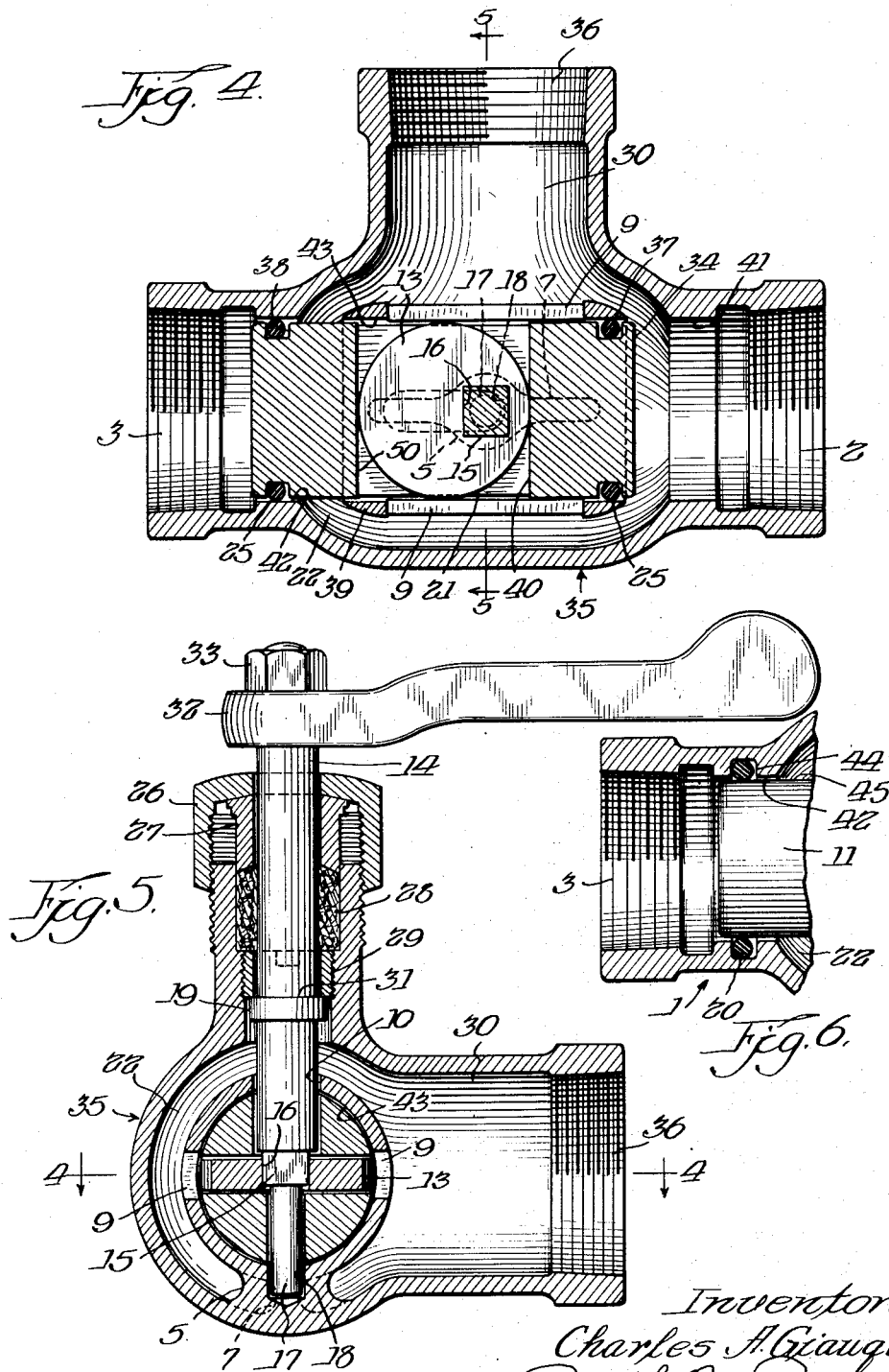

Patented Dec. 15, 1953

2,662,721

UNITED STATES PATENT OFFICE 2,662,721

VALVE

Charles A. Giauque, Berwyn, Ill., assignor to Crane Co., Chicago, Ill., a corporation of Illinois Application May 8, 1948, Serial No. 25,883

1 Claim. (Cl. 251—40)

This invention relates generally to valves and more particularly it is concerned with a novel construction of valve in which simplicity of construction, compactness and ease of assembly are important features.

More especially, the valve of this invention relates to a construction in which taper, abutting or ball seating surfaces are avoided and in contrast relatively economical straight machining is used therefor.

Another important object is to provide a construction in which minimum changes in flow direction are essential and a plunger type of structure is employed whereby which fluid pressure within the pipe line contributes to obtaining seat tightness by means of a construction preferably employing an O-ring or the like.

Another important object is to provide for a valve construction in which the disc or closure member may be assembled with the body by being insertable from either end of the valve body or casing rather than through the bonnet which may then be considerably reduced in size.

A further important object is to provide for a valve construction in which relatively difficult machining is minimized, and, as a result, the valve may be produced more cheaply than heretofore, and also one in which the seat tightness means between the closure member and the valve body may be accomplished by simple replacement when necessary.

It should be understood in connection with considering the pressure-drop losses occurring in the usual globe valve construction that frequently such changes may bring about as many as six changes in direction so that excessive pressure-drop results. Heretofore also in view of the numerous seating surfaces employed, the critical requirement for almost perfect alignment has existed and was not consistently obtained.

Other objects and advantages of the instant invention will become more readily apparent upon proceeding with the specification read in light of the accompanying drawings in which Fig. 1 is a sectional assembly view of a preferred embodiment of my invention.

Fig. 2 is a sectional assembly view taken on the line 2—2 of Fig. 1.

Fig. 3 is a transverse sectional view taken on the line 3—3 of Fig. 1.

Fig. 4 is a transverse sectional view of a modified form known as a three-way valve and taken on the line 4—4 of Fig. 5.

Fig. 5 is a sectional assembly view of the modified form taken on the line 5—5 of Fig. 4.

Fig. 6 is a fragmentary section of a modified form in which the sealing means is located entirely within the housing or casing of the novel valve.

Similar reference numerals refer to similar parts throughout the several views.

Referring now to Fig. 1, the valve body 1 is preferably of a shape conventionally referred to as the watermelon type, and is provided with the usual inlet connection at 2 and the outlet as at 3 respectively for attachment to a pipe-line not shown. Obviously the type of connection may vary with the kind of service encountered or the size of valve. The valve body 1 comprises a hollow cylinder 4 supported at its upper and lower end portions within said body by means of the horizontally extending ribs at top and bottom designated 6 and 7 respectively. The lower portion of the rib 7 at its central section is formed with a hub 5 as indicated more clearly in Fig. 2 to receive a guide as hereinafter described. It should be understood that the cylinder 4 particularly with respect to its inner peripheral portion 8 is preferably in axial alignment with the inlet and outlet 2 and 3 respectively so as to provide for relatively streamlined fluid flow through the valve body. The effect of this construction, insofar as benefits are concerned, is to permit not only tapping and machining the end portions for the said end connections simultaneously but also in preferably the same operation to provide for the finished surfaces necessary in enabling the axial movement of the closure member to be accomplished as hereinafter described. Preferably at both sides in diametrically opposed positions the cylindrical portion of the body designated 4 is provided with the horizontally extended slot 9 which serves to guide the cam actuating means subsequently referred to.

In continuing with a description of the novel valve assembly, relatively snugly fitted within the bore 8 of the cylinder 4 to permit a sliding action therebetween is the plunger or closure member 11 which is of substantially circular form in cross-section and is preferably provided at the central portion with the horizontally extending slot 12 which receives the eccentrically mounted circular cam member 13 which is positioned in non-rotatable relation to the stem 14, the latter member having a polygonal portion 15 closely fitting within the aperture 16 of the cam member 13. Extending below the apertured portion 16 of the cam 13 and the polygonally shaped section 15 of the stem 14 is the guide 17 for receiving the end of the stem journalled at 18 within the hub 5 of the body 1. Above the polygonal section 15 the stem is of substantially circular cross-section throughout its length including the shouldered mid-portion 19 for purposes hereinafter explained. It will be noted that the slotted portion or flattened chamber 12 which receives the circular cam member 13 is of substantially rectangular form when viewed in plan as shown in Fig. 3 with end limits defined by the walls 40 and 50 to contact the peripheral surface 21 of the cam. Accordingly, rotation of the stem member 14 will cause the circular cam 13 which is eccentrically mounted relative to the stem upon the polygonal portion 15 to move outwardly between either one of the slots 9, depending upon the direction of rotation. The latter cam rotation causes its outer surface 21 to be rotated and to bear against the surfaces 40 and 50 of the plunger or closure 11 thereby to effect the axial movement of the plunger or closure relative to the body 1, depending upon the direction of stem rotation, to open or close the annular passage 22 in the casing 1.

As shown, the chamber or passage 22 extends between the end limit of the inner cylinder 4 and the continuation or extension of the body which is provided with the bore 42 which coincides substantially with the inside finished periphery 8 of the sleeve 4. The closure member or plunger 11 at the downstream side is provided with the annular edge 23 extending within groove 24 to receive the O-ring 25. Thus as the plunger member 11 is moved longitudinally actuated by the rotation of the stem the O-ring 25 makes a sliding contact with the bore 42 fluid pressure causing it to bear against the annular edge 23 of the groove 24 in which it is positioned. It will be apparent that as the cam member 13 is rotated in an opposite direction it will draw the O-ring 25 away from such contact within the bore 42 so as to permit the O-ring to be substantially contained within the bore 8 and thereby allowing the flow of fluid through the valve to take place around the outside of the sleeve 4 past the annular chamber 22 and into the outlet 3.

A direct connection is made between the stuffing box 26 of the valve and the valve body 1, the stem being journalled rotatably as previously described and at its upper portion being surrounded by the stuffing box 26, the gland 27, the packing 28, the latter being supported by the threaded washer or bushing 29. The bushing 29 also serves to hold the stem 14 against any substantial axial movement while engaging the collar 31. The upper end portion of the stem for purpose of actuation is provided with the usual lever handle 32 and its retaining nut 33.

While the description thus far pertains to a straight way or 2-way valve, this invention is also capable of being applied to a 3-way or transfer valve in which it may be desirable to allow the flow to move from one portion of the pipeline to a transverse side. Thus, in referring now to the modified construction shown in Fig. 4, the means for effecting operation is substantially the same as that described in connection with Figs. 1 to 3 inclusive. However, it will be noted the significant difference lies in the manner in which the plunger or closure member 34 is positioned within the body 35, the latter having the chamber 30 and the side outlet 36. The plunger is provided with the grooves 37 and 38 at each end respectively to receive the O-rings 25. Thus the sleeve 39 is similarly formed with the longitudinally extending oppositely disposed slots 9 to allow for the eccentric rotation of the circular cam 13. But the valve body 35 instead of merely having a single bore, as at 23 in Fig. 1, is provided with a pair of end disposed bored-out portions 41 and 42, which upon rotation of the stem 14 in the manner described in connection with Figs. 1 to 3 inclusive, provides for the reciprocal movement and sliding engagement by the O-rings 25 within the respective bores 41 and 42, depending upon the direction of rotation of the stem 14. Thus in the valve position shown in Fig. 4 fluid flow will be permitted from the inlet 2 to the outlet 36, with the O-ring in the groove 38 bearing under pressure against the downstream edge of the groove 38 and the bore or inner periphery 42. Reversal of rotation of the stem 14 similarly permits the ring 25 mounted in the groove 37 to engage the bored out portion 41. When in the latter position, of course, the O-ring 25 is then receivable within the bore 43 of the sleeve 39.

It should, of course, be apparent that it is not absolutely necessary that the O-rings 25 be carried or supported by the plunger members 11 or 34. They may obviously be reversed in their position and as shown in the modified form in Fig. 6, the body, either 1 or 35, may be grooved as at 44 to receive the O-ring 25 in which case the plunger, either 11 or 34, may be reciprocally moved across the outer peripheral surface 45 of the plunger 11. Pressure of the fluid normally passing into the groove 44 will similarly create a pressure seal joint around the surface 45, and in the same manner, fluid pressure causes the ring to be expanded outwardly within the groove 44 and against both the downstream edge thereof as well as inwardly against the periphery 45.

While several embodiments have been shown and described it is of course obvious that the invention may be set forth in a number of other forms falling within the terms of the appended claim.

I claim:

A valve comprising a casing having a cylindrical portion, a plunger type closure member mounted within said cylindrical portion for sliding reciprocal movement therewithin, said closure member being of cylindrical outer configuration in the direction of reciprocal travel thereof and having an annular groove adjacent one end, said casing having a bored portion spaced from said cylindrical portion thereof and of substantially the same inside diameter as that portion, a deformable resilient ring element received within the annular groove of said closure member and engageable with the surface of said bore at substantially one end limit of closure movement to form a seal between the casing and said closure member under the action of fluid pressure exerted thereon, said ring element being engageable with the inside surface of said cylindrical portion of the casing at substantially the other end limit of movement of the closure member to withdraw said ring element from the line of fluid flow through the casing, said closure member being of such length as to permit the end thereof adjacent said ring element to be substantially even with the end of said cylindrical portion nearest said bored portion when said closure member is in said other end limit of movement to provide for substantially unobstructed smooth flow around said nearest end of said cylindrical portion, said casing having an exterior wall portion containing said cylindrical portion and spaced from the same to provide for free fluid flow around said portion, said wall portion being outwardly flared adjacent each end thereof, said ends extending beyond said cylindrical portion in opposite directions, one of said ends joining said bored portion of the casing, the flaring of said end originating at the end of the bore in said bored portion nearest said cylindrical portion, elongated means between said wall and cylindrical portions only at the top and bottom to support the latter portion and to provide for unobstructed fluid flow between the portions, stem means journalled within said casing above and below said closure member and intersecting said latter member, said stem means extending through the upper elongated supporting means and into the lower elongated means being contained within both of said means, said closure member being horizontally slotted therethrough intermediate the ends thereof, a cam plate within the slot in said closure member, said cam plate being eccentrically mounted on said stem means for rotation therewith, said cam plate being adapted to bear against the end surfaces of the closure slot to move the latter member into either of the end limits of movement alternatively, said cylindrical portion of the casing being horizontally slotted at each side in horizontal alignment with the slot in said closure member for reception of said cam plate intermediate the end limits of movement of said closure member, said slots of the cylindrical portion communicating with the flow space around said portion, said cam plate being of such size as to project through either of said slots in the cylindrical portion and substantially within the communicating flow space on either side when the closure member is moving intermediate the end limits.

CHARLES A. GIAUQUE.

References Cited in the file of this patent

UNITED STATES PATENTS

| Number | Name | Date |
|---|---|---|
| 190,680 | Hammer | May 15, 1877 |
| 1,809,567 | Pasman | June 9, 1931 |
| 2,106,736 | Haas | Feb. 1, 1938 |
| 2,210,282 | Corbin | Aug. 6, 1940 |
| 2,283,076 | Mattimore | May 12, 1942 |
| 2,357,965 | Mattimore | Sept. 12, 1944 |
| 2,360,733 | Smith | Oct. 17, 1944 |
| 2,414,451 | Christensen | Jan. 21, 1947 |
| 2,417,242 | Eckel | Mar. 11, 1947 |
| 2,445,505 | Ashton | July 20, 1948 |
| 2,574,142 | Seeloff | Oct. 3, 1950 |